US006466230B1

(12) United States Patent
Edmark

(10) Patent No.: US 6,466,230 B1
(45) Date of Patent: *Oct. 15, 2002

(54) DISPLAY TECHNIQUES FOR OBJECT VISIBILITY IN A THREE-DIMENSIONAL VIRTUAL WORLD

(75) Inventor: John T. Edmark, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/108,029

(22) Filed: Jun. 30, 1998

(51) Int. Cl.⁷ .................................................. G09G 5/00
(52) U.S. Cl. ...................................... 345/629; 345/419
(58) Field of Search ............................... 345/435, 419, 345/113, 421, 629, 427, 660, 672

(56) References Cited

U.S. PATENT DOCUMENTS

| 5,596,690 A | * | 1/1997 | Stone et al. | ................. | 345/435 |
| 5,608,850 A | * | 3/1997 | Robertson | .................... | 345/421 |
| 6,256,044 B1 | * | 7/2001 | Carraro et al. | ............... | 345/433 |

FOREIGN PATENT DOCUMENTS

EP          0582815 A      2/1994

OTHER PUBLICATIONS

Youichi Horry et al., "Tour Into The Picture: Using A Spidery Mesh Interface To Make Animation From A Single Image," Computer Graphics Proceedings, Annual Conference Series, 1997, pp. 225–232.

* cited by examiner

Primary Examiner—Mark Zimmerman
Assistant Examiner—Philip H. Stevenson
(74) Attorney, Agent, or Firm—John De La Rosa

(57) ABSTRACT

A limitation of modeling three-dimensional objects in a virtual world occurs when a user moves within the world and still wishes a certain target object to remain visible, instead of being occluded by other surfaces in front of the object along the direction the user is viewing the target object. Therefore, in accordance with the principles of the invention, a target object which is to remain visible, regardless of the user's view point, is duplicated and modeled as being located a close distance to the user, but scaled accordingly to make the cloned object appear to be farther away from the viewpoint of the user and co-located with and of the same size and orientation as the target object. In this manner, as the user moves within the world, surfaces located in front of the target object do not occlude the cloned object from the user's view, thus appearing to give that same property to the target object.

31 Claims, 5 Drawing Sheets

DISPLAY TECHNIQUES FOR OBJECT VISIBILITY IN A THREE-DIMENSIONAL VIRTUAL WORLD

TECHNICAL FIELD

This invention relates to three-dimensional modeling, and more particularly, to three-dimensional computer graphics used to display a virtual world to a user.

BACKGROUND OF THE INVENTION

Three-dimensional modeling based on the real-world contains detailed data used to compute what objects are visible from the user's viewpoint, and in that view direction to render them appropriately on a video screen. To effect realism, objects are rendered to look solid, with surfaces behind those objects along the direction of the user's viewpoint typically removed. In certain applications, however, it is desirable that surfaces not occlude from the user's view a target object, such as in displaying cut-way views, which typically requires considerable computation power and cost to do so.

SUMMARY OF THE INVENTION

A limitation of modeling three-dimensional objects in a virtual world occurs when a user moves within the world and still wishes a certain target object to remain visible, instead of being occluded by other surfaces in front of the object along the direction the user is viewing the object. Therefore, in accordance with the principles of the invention, a target object which is to remain visible, regardless of the user's view point, is duplicated and modeled as being located a close distance to the user, but scaled accordingly to make the cloned object when displayed appear to be farther away from the user's viewpoint and co-located with and of the same size and orientation as the target object. In this manner, as the user moves within the world, surfaces located in front of the target object do not occlude the cloned object from the user's view, thus appearing to give that same property to the target object.

DETAILED DESCRIPTION

Figure 1:
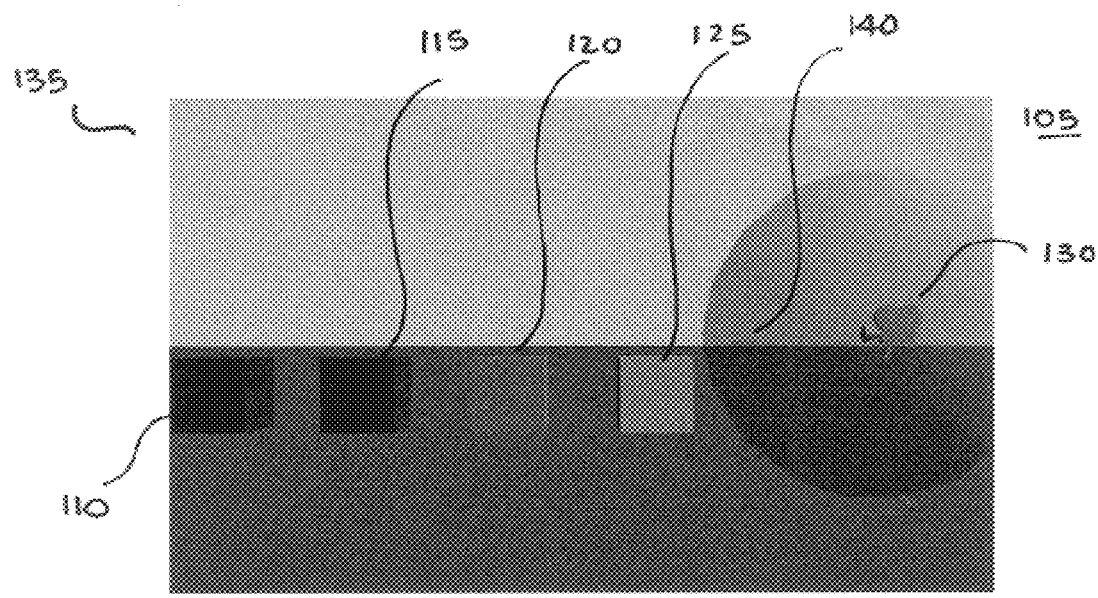
FIG. 1 shows an exemplary view of a three-dimensional world useful for illustrating the principles of the present invention.
Figure 2:
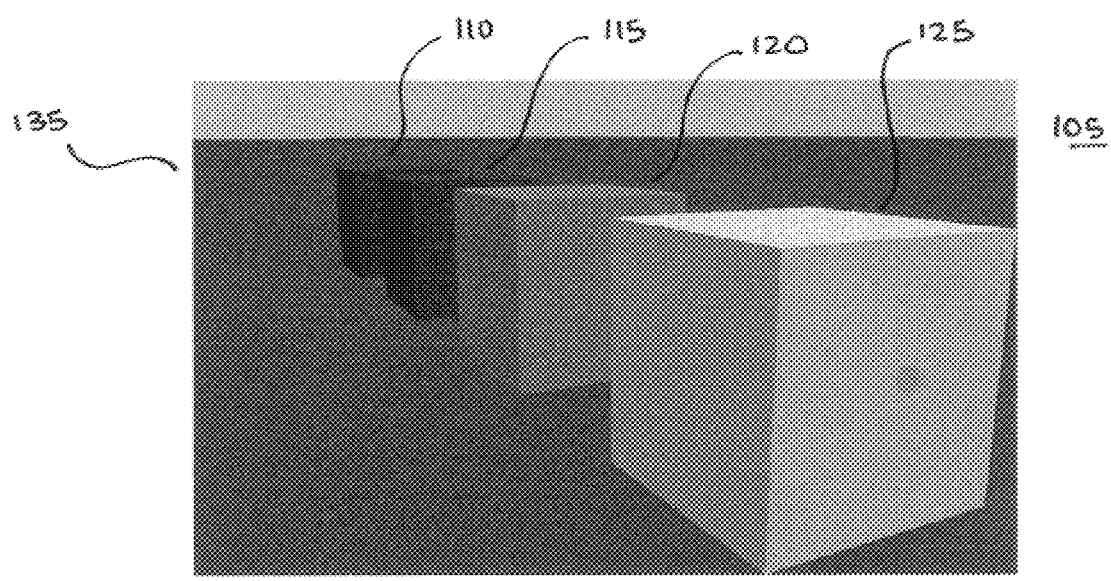
FIGS. 2–3 show what a user would see of the three-dimensional world of FIG. 1 from different viewpoints, without the use of the present invention.
Figure 3:
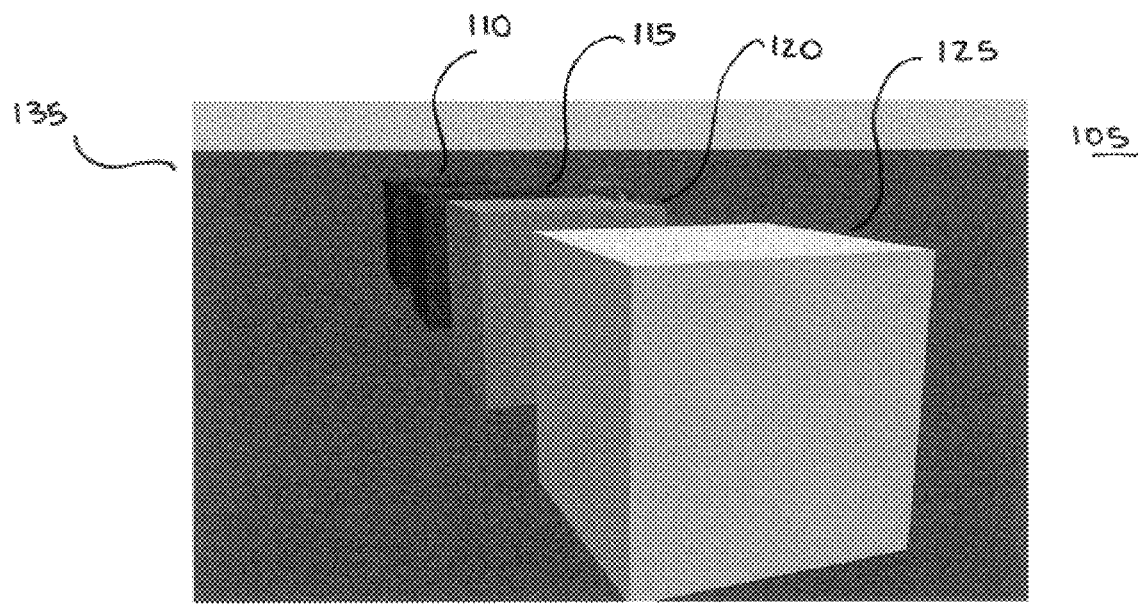
Figure 4:
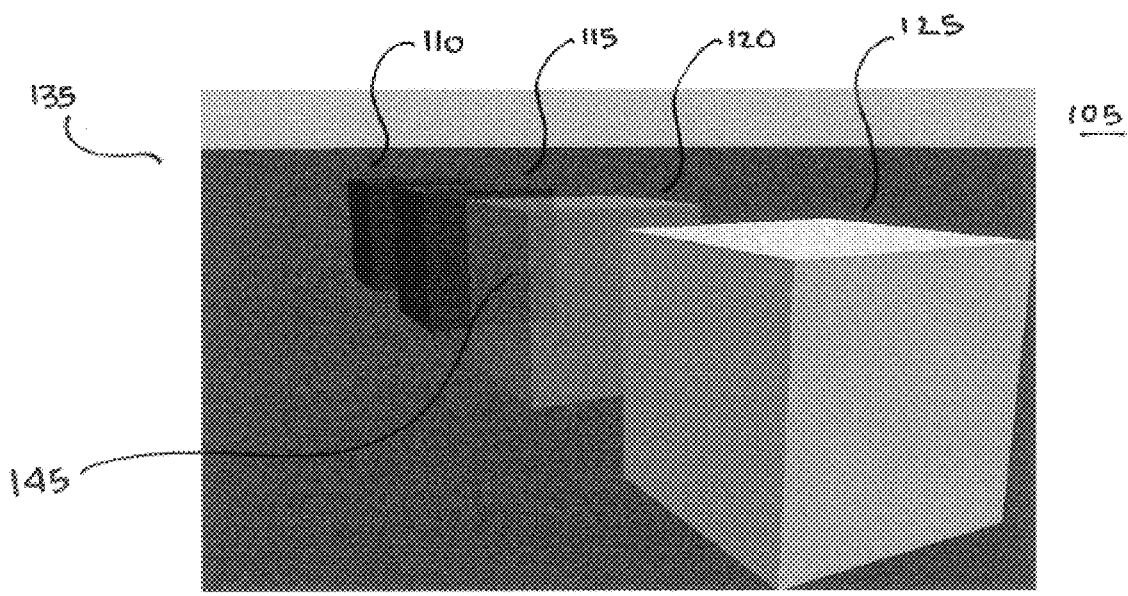
FIG. 4 shows what a user would see of the three-dimensional world of FIG. 2 with the red cube therein "prioritized for visibility," in accordance with the principles of the invention.

To better illustrate the present invention, FIGS. 1–3 show examples of that which a user sees when the user moves within a three-dimensional virtual world, without the use of the present invention. In accordance with the principles of the invention, however, FIG. 4 shows an example of that which a user sees when viewing a target object which should have been occluded by surfaces in front thereof, but instead is visible to the user by cloning the target object and modeling the object as being located a close distance to the user. Importantly, the cloned object is scaled accordingly to make the object appear to be co-located with and of the same size and orientation as the target object. As the user moves within the world, surfaces located in front of the target object do not occlude the cloned object from the user's view, thus appearing to give that same property to the target object. In other words, FIG. 4 shows an example of a target object being so-called "prioritized for visibility," i.e., remaining visible to the user regardless of the user's viewpoint, even though there are surfaces in front of the object which should have occluded portions of the target object. For simplification of terminology purposes, a portion of the target object may simply be referred to as the target object inasmuch as any portion of the target object may be considered the target object in its own right.

More specifically, FIG. 1 shows a simplistic three-dimensional virtual world 105 consisting of four, equal size cubes: a blue cube 110, a red cube 115, a green cube 120 and a yellow cube 125. World 105 is represented using computer graphics techniques and objects therein modeled in, for example, the Virtual Reality Modeling Language (VRML). Yellow movie camera 130 represents the viewpoint from which a user is to later view the four cubes. Note that although the three-dimensional objects cannot be actually rendered in a two-dimensional plane (x,y), they can be projected to and displayed on, for example, a video screen 135 or other two-dimensional plane so as to appear to have three dimensions (x,y,z). Accordingly, the techniques of the present invention are preferably employed with computers and software, which are sufficiently sophisticated to display objects on video screen 135 as having three dimensions. Note that to make the objects look realistic, computer graphics display techniques use the z component of objects to scale the x and y components as they get closer to and farther from the viewpoint of the user.

FIG. 2 shows world 105 of FIG. 1, but taken from the viewpoint of movie camera 130. As results of the user's new viewpoint, although yellow cube 125 is entirely visible to the user, only portions of the green, red and blue cubes are visible. This is so because from the direction the user is viewing the cubes, the surfaces of yellow cube 125 block portions of green cube 120, surfaces of green cube 120 block portions of red cube 115, and surfaces of red cube 115 block portions of blue cube 110. Viewed from other viewpoints, different portions of the blue, red and green cubes would be occluded from the user's view and likewise would not be visible to the user, as shown in FIG. 3.

In accordance with the principles of the invention, however, red cube 115, for example, may be so-called "prioritized for visibility" so as not to be occluded by any portion of green cube 120. FIG. 4 shows world 105 of FIG. 2, but with a copy, or "clone," of red cube 115 positioned in front of yellow cube 125 and scaled to make the clone of the red cube, when displayed, appear to be located at the same position and of the same size and orientation as red cube 115. Referring back to FIG. 1, there is depicted cloned red cube 140 positioned in front of yellow cube 125, but viewed from a different viewpoint. Based on this new three-dimensional model of the objects in the world 105, the computer graphics display software computes what objects are visible from the user's viewpoint, and does so without appearing to occlude from the user's view any portion of cloned red cube 140. From a user's viewpoint, he/she cannot, however, discern the difference between the target and cloned objects, giving the illusion that red cube 115 is unoccluded.

In the embodiment of FIG. 4, the cloned copy (140) of red cube 115 has been imbued with properties of being semi-transparent, so that the occluding surfaces of green cube 120 are also semi-visible. Doing so, however, causes the colors of overlapping portions 145 of red cube 115 and green cube 120 to mix somewhat. In this latter case, cloned copy 140 cannot occlude other objects. Accordingly, target object then serves to occlude those objects located farther from and along the user's viewpoint. Alternatively, the cloned copy (140) of red cube 115 could have been modeled as solid, but then the portion of green cube 120 which should have occluded red cube 115 would not be at all visible. In this case, the target object need not be displayed inasmuch as it is not visible to the user.

Figure 5:
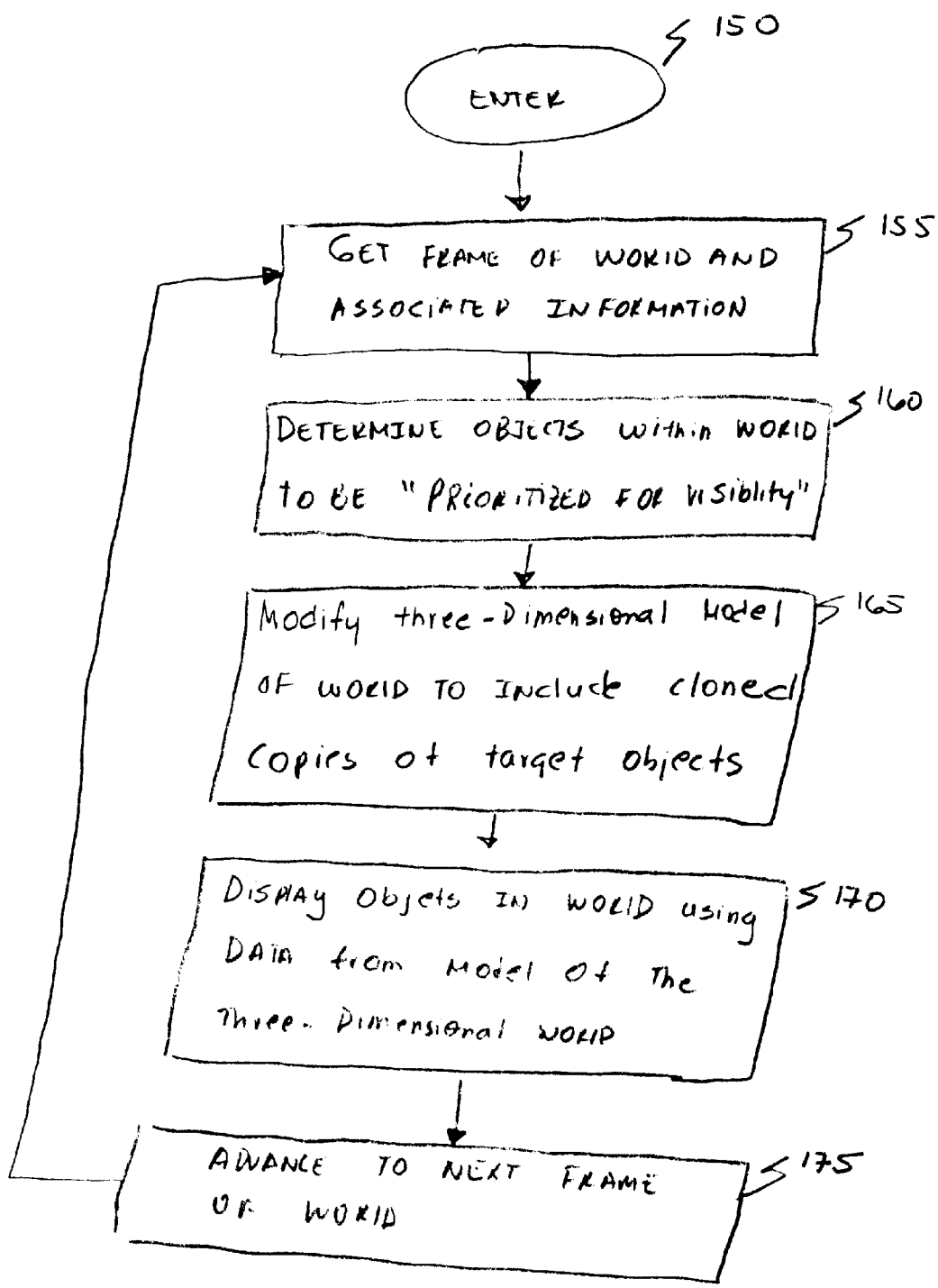
FIG. 5 shows an exemplary process for displaying the world to a user, in accordance with the principles of the invention.

FIG. 5 shows an exemplary process by which an object within world 105 that has been prioritized for visibility so as not to be occluded by the surfaces of other objects is displayed in the three-dimensional world, regardless of the user's viewpoint, using computer graphics techniques. In the typical embodiments of the invention, the objects to be displayed are modeled using computer modeling techniques so that their size, shape, location and orientation are known. This three-dimensional modeling is then used by a computer graphics display engine to compute what objects are visible from the user's viewpoint and, in that view direction, to render them appropriately on two-dimensional video screen 135.

The process is entered at step 150 when the user first selects which world to view and the first frame of the world is to be displayed to the user. At step 155, the frame to be displayed is retrieved, such as by retrieving data representing the frame which is pointed to by a pointer. Such a frame pointer is set initially, e.g., at step 150, to point to the first frame of the world. Next, at step 160, it is determined if there are any objects within the current frame which have been prioritized for visibility. This may be achieved by employing additional information associated with the frame that describes the objects therein. In addition, the viewpoint is determined, which is typically set or controlled by the user. In step 165, a copy of each target object selected to be prioritized for visibility is made, and the three-dimensional model of the world is accordingly modified to include the cloned objects. These cloned object are positioned at a close distance in front of the viewpoint of the user, but scaled so as to make them appear to be, when displayed on video screen 135, co-located with, and of the same size and orientation, as the respective corresponding target object.

At step 170, a computer graphics display engine routine uses the data from the three-dimensional model of world 105 to display the objects on video screen 135 in a manner for a user to perceive them as three-dimensional objects along the viewpoint set by the user. Next, control passes from step 170 to step 175 which advances the frame. This may be achieved by incrementing or otherwise updating the value of the frame pointer. Thereafter, control passes back to step 155 and the process continues as described above. As the user moves within the world, surfaces located in front of the target object do not occlude the cloned object from the user's view, thus appearing to give that same property to the target object.

Figure 6:
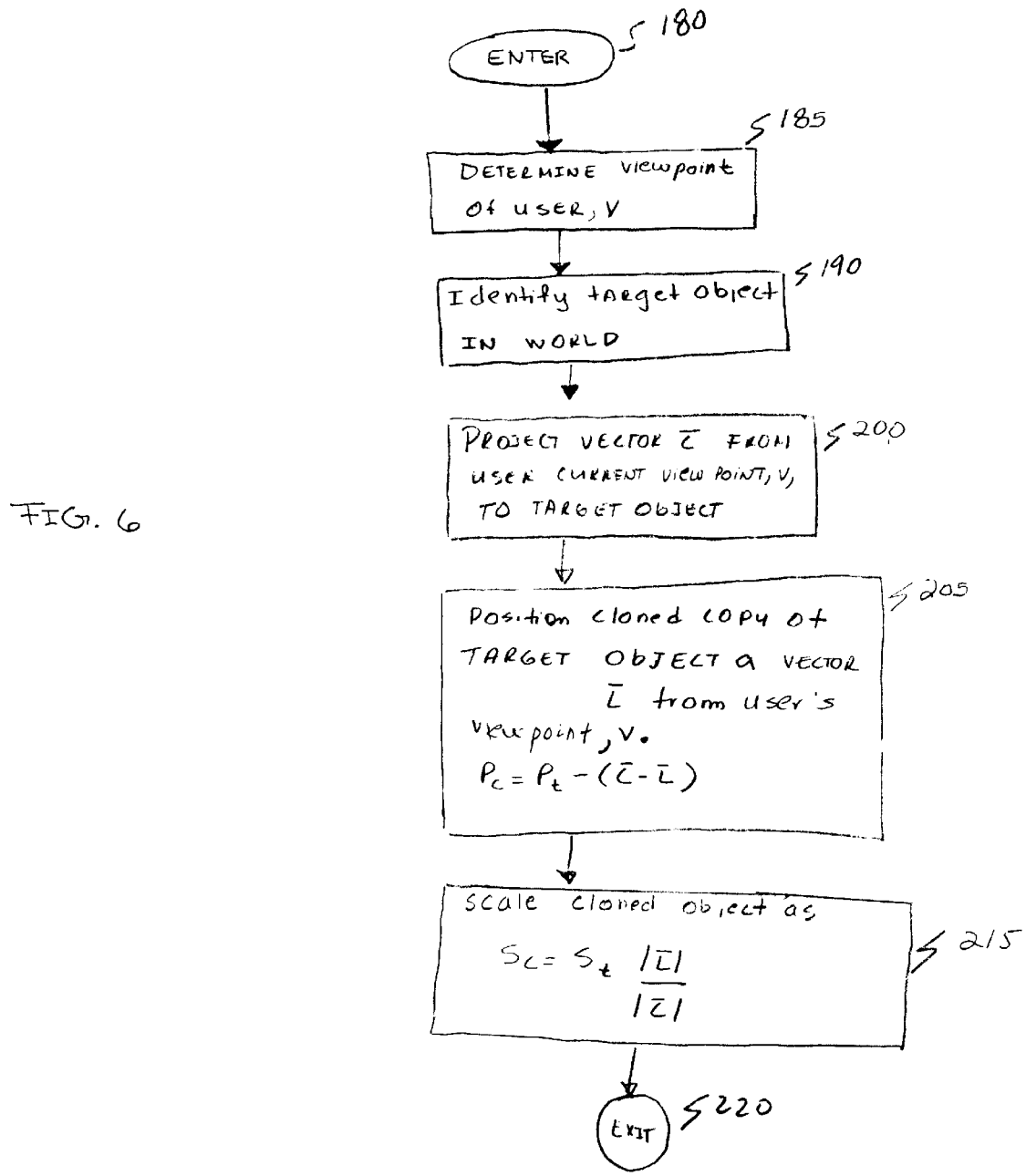
FIG. 6 shows an exemplary process for "prioritizing for visibility" an object which is to remain visible, even though occluded by other objects in the world.

FIG. 6 shows an exemplary process in accordance with the principles of the invention for modifying the three-dimensional model of the world to include a cloned object displayed in step 170 of FIG. 5. The process is entered at step 180 whenever it is determined that the three-dimensional model of the world needs to be modified. Thus, execution of the process of FIG. 6, may be linked to step 165 or it may be independent thereof. Next, in step 185, the viewpoint of the user, V, is determined. Thereafter, in step 190, a target object 195 is identified to be prioritized for visibility. Such a target object may be identified by a set flag, such as a SET_OCCLUSION, within the data structure for the object.

Figure 7:
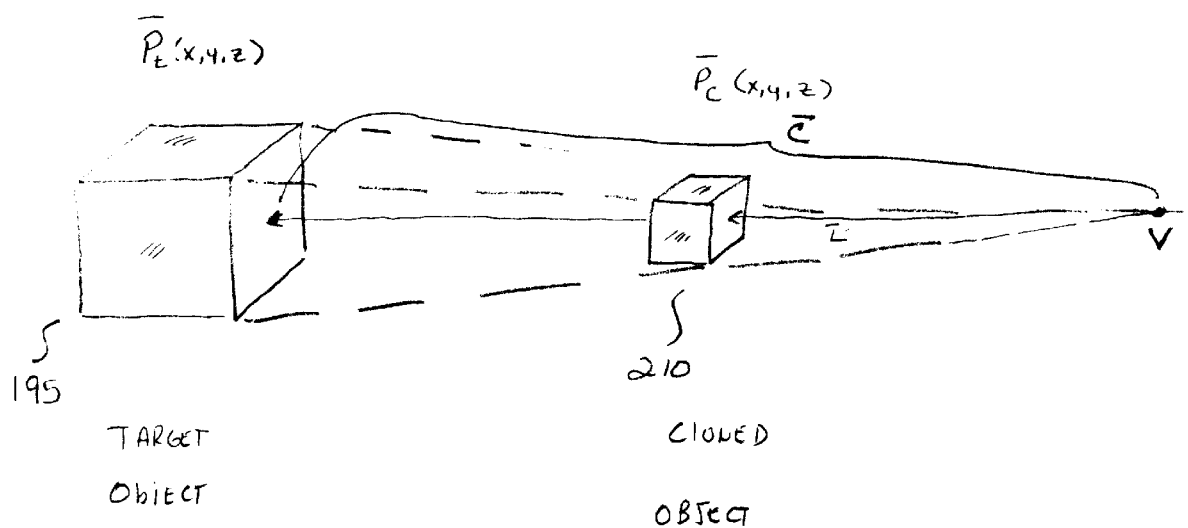
FIG. 7 shows a target object being copied or cloned for purposes of describing the process of FIG. 6.

Using the current three-dimensional model of world 105, a vector, $\overline{C}$, is projected from the user's current viewpoint, V, to target object 195 (step 200), e.g., red cube 115 of world 105, as shown in FIG. 7. Target object 195 is located at $\overline{P}_t(x, y, z)$. At step 205, the three-dimensional model of the world is modified to include a copy or clone (210) of target object 195 positioned at vector $\overline{L}$ from the user's viewpoint, which vector is co-parallel with vector $\overline{C}$. The location $\overline{P}_c$ of the cloned object is given by $\overline{P}_c(x, y, z)=\overline{P}_t-(\overline{C}-\overline{L})$. The length of this latter vector $\overline{L}$ is chosen such that no other object or surface in world 105 occludes cloned object 210 from the current user's viewpoint, V. Note that simply doing so, however, would cause the corresponding computer display graphics to appropriately scale cloned object to make it appear closer to the user when displayed on video screen 135. As such, at step 215, cloned object 210 is scaled to make it appear to be located at the same position and of the same size and orientation as target object 195. This scaling or transform is given by:

$$S_c = S_t \frac{|L|}{|C|}$$

where $S_c$ is the size of the cloned object, and $S_t$ is the size of the target object. In other words, cloned object 210 is scaled by the ratio $$\frac{|L|}{|C|}.$$

Using the three-dimensional model of the world, now including cloned object 210, the computer display graphics computes what objects are visible from the user's viewpoint. Recall that since cloned object 210 is placed a distance close enough to the user's viewpoint, there are no intervening surfaces or objects to occlude the cloned object from the user's view. Thus, cloned object 210 always remains entirely visible. From a user's viewpoint, however, he/she cannot discern the difference between the target and cloned objects, giving the illusion that target object 195 is completely visible or unoccluded.

Thereafter, the process exits at step 220, and in step 170 of FIG. 5, a representation of cloned object 210 along with the other objects of world 105 are displayed, such as through computer display graphics techniques.

The cloned copy (210) of target object 195 may be imbued with different properties, such as being semi-transparent. In such a case, step 215 would encompass imbuing cloned object 210 with such a property. In this latter manner, surfaces which should have occluded target object 195 are made semi-visible. So doing may cause the colors of the overlapping portions of the target object, and the object that should have occluded it to mix and form possibly a different color. Alternatively, the cloned copy (210) of target object 195 may be modeled as solid, but then the surfaces of the object that should have occluded the target object would not be at all visible.

Note that in the above process, there may be more than one target object. In this case, each target object may be given a different level of priority. For example, referring back to FIG. 1, let us assume that green cube 120 should never be occluded, and that red cube 115 should never be occluded, except by green cube 120. Then, a copy of green cube 120 may be positioned in front of yellow cube 125 and scaled to make it appear when displayed to be located at the same position and of the same size and orientation as green cube 120. Also, a copy of red cube 115 may be positioned in front of yellow cube 125, but behind the cloned copy of green cube 120. The clone of red cube 115 likewise is scaled to make it appear when displayed to be located at the same position and of the same size and orientation as red cube 115. Based on this new three-dimensional model of the objects in world 105, green cube 120 always remains entirely visible. Also, red cube 115 always remains visible, unless occluded by green cube 120.

The foregoing merely illustrates the principles of the invention. It will thus be appreciated that those skilled in the art will be able to devise various arrangement which, although not explicitly described or shown herein, embody the principles of the invention and are included within its spirit and scope.

What is claimed is:

1. A method for use in processing a view of a three-dimensional world which is modeled, at least in part, as computer graphics, comprising the steps of:
   cloning a first object in the world which is at least in part occluded by a second object along a user's viewpoint;
   modeling the cloned object as being located a distance sufficiently close to the user's viewpoint so as to be entirely visible to the user;
   scaling the cloned object to make it appear, when displayed, to be co-located with and of the same size and orientation as the first object; and
   displaying the cloned object with the first and second objects.

2. The invention as defined in claim 1 wherein said scaling of the cloned object in said scaling step is a function of the distance from the user's viewpoint to the first object, and the distance from the user's viewpoint to the cloned object.

3. The invention as defined in claim 1 wherein said modeling of the cloned object in said modeling step further includes modeling the cloned object as being semi-transparent.

4. The invention as defined in claim 1 wherein said modeling of the cloned object in said modeling step further includes modeling the cloned object as being solid.

5. A method for use in processing a view of a three-dimensional world which is modeled, at least in part, as computer graphics, comprising the steps of:
   cloning a first object in the world which is at least in part occluded by a second object along a user's viewpoint;
   modeling the cloned object as being located a distance sufficiently close to the user's viewpoint so as to be unoccluded by the second object;
   scaling the cloned object to make it appear, when displayed, to be co-located with and of the same size and orientation as the first object; and
   displaying the cloned object with the first and second objects.

6. The invention as defined in claim 5 wherein said scaling of the cloned object in said scaling step is a function of the distance from the user's viewpoint to the first object, and the distance from the user's viewpoint to the cloned object.

7. The invention as defined in claim 5 wherein said modeling of the cloned object in said modeling step further includes modeling the cloned object as being semi-transparent.

8. The invention as defined in claim 5 wherein said modeling of the cloned object in said modeling step further includes modeling the cloned object as being solid.

9. A method for use in processing a view of a three-dimensional world which is modeled, at least in part, as computer graphics, comprising the steps of:
   translating within the world a first object having an apparent size and orientation, which is in part occluded by a second object along a user's viewpoint, from its original position to a distance sufficiently close to the user's viewpoint so as not to be occluded by the second object, said first and second object being represented as computer graphics;
   scaling the translated first object to make it appear, when displayed, to be co-located with and of the same apparent size and orientation as the first object when located at its original position; and
   displaying the translated object with the second object.

10. The invention as defined in claim 9 wherein said scaling of the translated object in said scaling step is a function of the distance from the user's viewpoint to the first object, and the distance from the user's viewpoint to the translated object.

11. The invention as defined in claim 9 further comprising the step of imbuing the translated object with the property of being semi-transparent.

12. The invention as defined in claim 9 further comprising the step of imbuing the translated object with the property of being solid.

13. A method for use in processing a view of a three-dimensional world which is modeled, at least in part, as computer graphics, comprising the steps of:
   transforming within the world a first object having an apparent size and orientation at an original position, which is in part occluded by a second object along a user's viewpoint, such that the transformed first object is a distance sufficiently close to the user's viewpoint so as not to be occluded by the second object, said first and second objects being represented by computer graphics, and when displayed, to be co-located with and of the same apparent size and orientation as the untransformed first object at its original position; and
   displaying the transformed object with the second object.

14. A method for use in processing a view of a three-dimensional world which is modeled, at least in part, as computer graphics, comprising the steps of:
   projecting a vector $\overline{C}$ originating at a user's viewpoint and terminating at a first object in the world;
   cloning the first object in the world which is at least in part occluded by a second object along a user's viewpoint;
   modeling the cloned object as being located a vector $\overline{L}$ from the user's viewpoint so as not to be occluded by the second object;
   scaling the cloned object by the ratio $|\overline{L}|/|\overline{C}|$ to make it appear, when displayed, to be co-located with and of the same size and orientation as the first object; and
   displaying the cloned object with the first and second objects.

15. The invention as defined in claim 14 wherein said modeling of the cloned object in said modeling step further includes modeling the cloned object as being semi-transparent.

16. The invention as defined in claim 14 wherein said modeling of the cloned object in said modeling step further includes modeling the cloned object as being solid.

17. A method for use in processing a view of a three-dimensional world which is modeled, at least in part, as computer graphics, comprising the steps of:

cloning copies of first and second objects in the world, each of which is at least in part, occluded by a third object along a user's viewpoint;

modeling the cloned copy of the first object as being located a distance sufficiently close to the user's viewpoint so as to be unoccluded by either the second or third object;

modeling the cloned copy of the second object as being located a distance sufficiently close to the user's viewpoint so as to be unoccluded by the third object;

scaling the cloned copies of the first and second objects to make them appear, when displayed, to be co-located with and of the same size and orientation as the first and second objects, respectively; and displaying the cloned copies of the first and second objects with the third object.

18. The invention as defined in claim 17 wherein said scaling of the cloned copies in said scaling step is a function of the distances from the user's viewpoint to the first and second objects, and the distance from the user's viewpoint to the cloned copies of the first and second objects.

19. The invention as defined in claim 17 wherein said modeling of the cloned copies in said modeling step further includes modeling the cloned copies as being semi-transparent.

20. The invention as defined in claim 17 wherein said modeling of the cloned copies in said modeling step further includes modeling the cloned copies as being solid.

21. A system for use in processing a view of a three-dimensional world which is modeled, in least in part, as computer graphics, said system comprising:

means for cloning a first object in the world which is at least in part occluded by a second object along a user's viewpoint;

means for modeling the cloned object as being located a distance sufficiently close to the user's viewpoint so as not to be occluded by the second object;

means for scaling the cloned object to make it appear, when displayed, to be co-located with and of the same size and orientation as the first object; and means for displaying the cloned object with the first and second objects.

22. The invention as defined in claim 21 wherein the cloned object is scaled as a function of the distance from the user's viewpoint to the first object, and the distance from the user's viewpoint to the cloned object.

23. The invention as defined in claim 21 wherein the cloned object is modeled as being semi-transparent.

24. The invention as defined in claim 21 wherein the cloned object is modeled as being solid.

25. An apparatus for use in processing a view of a three-dimensional world which is modeled, at least in part, as computer graphics, said apparatus comprising:

means for determining a user's viewpoint;

means for projecting a vector $\overline{C}$ originating at the user's viewpoint and terminating at a first object in the world;

means for cloning the first object in the world which is in part occluded by a second object along the user's viewpoint;

means for modeling the cloned object as being located a vector $\overline{L}$ from the user's viewpoint so as not to be occluded by the second object;

means for scaling the cloned object by the ratio $|\overline{L}|/|\overline{C}|$ so as to make it appear, when displayed, to be co-located with and of the same size and orientation as the first object; and means for displaying the cloned object with the first and second objects.

26. The invention as defined in claim 25 wherein said cloned object is modeled as being semi-transparent.

27. The invention as defined in claim 25 wherein said cloned object is modeled as being solid.

28. An apparatus for use in processing a view of a three-dimensional world which is modeled, at least in part, as computer graphics, said apparatus comprising:

means for translating within the world a first object having an apparent size and orientation at its original position, which is at least in part occluded by a second object along a user's viewpoint, from its original position to a distance sufficiently close to the user's viewpoint so as to be unoccluded by the second object, said first and second object being represented as computer graphics;

means for scaling the translated first object to make it appear, when displayed, to be co-located with and of the same apparent size and orientation as the first object at its original position; and means for displaying the translated object with the second object.

29. The invention as defined in claim 28 wherein said scaling of the translated object in said scaling step is a function of the distance from the user's viewpoint to the first object, and the distance from the user's viewpoint to the translated object.

30. The invention as defined in claim 28 further comprising the step of imbuing the translated object with the property of being semi-transparent.

31. The invention as defined in claim 28 further comprising the step of imbuing the translated object with the property of being solid.

* * * * *